(12) United States Patent
Hamada

(10) Patent No.: US 6,501,528 B1
(45) Date of Patent: Dec. 31, 2002

(54) STACKED DISPLAY DEVICE WITH FOLDED SUBSTRATE

(75) Inventor: Ryohei Hamada, Yamanashi-ken (JP)

(73) Assignee: Casio Computer Co., Ltd., Tokyo (JP)

( * ) Notice: Subject to any disclaimer, the term of this patent is extended or adjusted under 35 U.S.C. 154(b) by 211 days.

(21) Appl. No.: 09/717,365

(22) Filed: Nov. 20, 2000

(30) Foreign Application Priority Data

Nov. 26, 1999 (JP) ............................................. 11-336422

(51) Int. Cl.[7] .............................................. G02F 1/1333
(52) U.S. Cl. .............................. 349/158; 349/74; 345/4; 345/5
(58) Field of Search ................................. 349/158, 160, 349/162, 12, 75–83, 73, 74; 345/4, 5

(56) References Cited

U.S. PATENT DOCUMENTS 4,597,635 A * 7/1986 Hoshikawa ................... 350/334
5,436,744 A * 7/1995 Arledge et al. ................ 359/82

* cited by examiner

Primary Examiner—Toan Ton
Assistant Examiner—Andrew Schechter
(74) Attorney, Agent, or Firm—Frishauf, Holtz, Goodman & Chick, P.C.

(57) ABSTRACT

One intermediate substrate is disposed in one film substrate bent at a predetermined portion, one end side from a bent portion of the film substrate is made to oppose one surface of the intermediate substrate to construct a first panel, the other end side from the bent portion is made to oppose the other surface of the intermediate substrate to construct a second panel, and an edge portion on one side of the film substrate is made to project from the intermediate substrate. A plurality of terminal electrodes corresponding to first panel electrodes and second panel electrodes formed on both surfaces of the intermediate substrate and on the inner surfaces of the one end side and the other end side of the film substrate, which oppose the two surfaces of the intermediate substrate, respectively, are formed together at the edge portion.

20 Claims, 4 Drawing Sheets

STACKED DISPLAY DEVICE WITH FOLDED SUBSTRATE

CROSS-REFERENCE TO RELATED APPLICATIONS

This application is based upon and claims the benefit of priority from the prior Japanese Patent Application No. 11-336422, filed Nov. 26, 1999, the entire contents of which are incorporated herein by reference.

BACKGROUND OF THE INVENTION

The present invention relates to a stacked display device and, more particularly, to a stacked display device constructed by one intermediate substrate and one outer substrate which sandwiches the intermediate substrate.

As electrooptic display devices using, e.g., a liquid crystal panel, a composite-type device having a touch input panel stacked on the front surface of a display panel on the observation side and a two-layered device having two, front and rear display panels are stacked are conventionally known. These devices are called stacked display devices.

FIG. 1 is a sectional view of a conventional stacked display device in which hatching is omitted. FIG. 1 shows a composite-type display device having a touch input panel (to be referred to as a touch panel hereinafter) 2 stacked on the front surface of a liquid crystal display panel 1.

In this stacked display device, one intermediate substrate 10 is shared as substrates on the adjacent sides of the liquid crystal display panel 1 and touch panel 2. This device comprises the intermediate substrate 10, a display panel substrate 11 opposing the rear surface of the intermediate substrate 10, and a touch panel substrate 12 opposing the front surface of the intermediate substrate 10.

The intermediate substrate 10 and display panel substrate 11 are transparent substrates made of glass. Transparent display panel electrodes 13 and 14 opposing each other are formed on the rear surface of the intermediate substrate 10 and on the inner surface (surface opposing the intermediate substrate 10) of the display panel substrate 11, respectively. Alignment films 15 and 16 cover the electrodes 13 and 14, respectively.

One of the intermediate substrate 10 and display panel substrate 11, and for example, the display panel substrate 11 has, on one end side, an edge portion projecting from the intermediate substrate 10 as the other substrate. The edge portion has, on its inner surface, a plurality of display panel terminal electrodes 17 corresponding to the display panel electrodes 13 and 14 formed on the rear surface of the intermediate substrate 10 and on the inner surface of the display panel substrate 11, respectively.

Although not illustrated in FIG. 1, the inner surface of the display panel substrate 11 has lead wires which connect the display panel electrodes 14 formed on the inner surface of the display panel substrate 11 to predetermined terminal electrodes of the plurality of display panel terminal electrodes 17 formed at the edge portion, pad electrodes corresponding to the terminal connections of the display panel electrodes 13 formed on the rear surface of the intermediate substrate 10, and lead wires which connect the pad electrodes to the remaining predetermined terminal electrodes of the plurality of display panel terminal electrodes 17.

The intermediate substrate 10 and display panel substrate 11 are jointed by a first frame-shaped sealing member 18 inserted therebetween while maintaining a predetermined gap. The terminal connections of the display panel electrodes 13 formed on the rear surface of the intermediate substrate 10 and the above-described pad electrodes on the inner surface of the display panel substrate 11 are electrically connected through conductive members (not shown) in or near the substrate joint region by the sealing member 18. A liquid crystal is encapsulated in the region in the gap, surrounded by the sealing member 18 between the intermediate substrate 10 and the display panel substrate 11 to form a liquid crystal layer 19. The liquid crystal display panel 1 has the above-described structure.

The touch panel substrate 12 opposing the front surface of the intermediate substrate 10 is formed from a transparent resin film having flexibility. Transparent touch panel electrodes 20 and 21 are formed on the front surface of the intermediate substrate 10 and the inner surface (surface opposing the intermediate substrate 10) of the touch panel substrate 12 made of a resin film, respectively, so as to extend in directions perpendicular to each other.

One of the intermediate substrate 10 and touch panel film substrate 12, and for example, the intermediate substrate 10 has, on one end side, an edge portion projecting from the film substrate 12 as the other substrate. The edge portion has, on its front surface, a plurality of touch panel terminal electrodes 22 corresponding to the touch panel electrodes 20 and 21 formed on the front surface of the intermediate substrate 10 and the inner surface of the film substrate 12, respectively.

Although not illustrated in FIG. 1, the front surface of the intermediate substrate 10 has lead wires which connect the touch panel electrodes 20 formed on the front surface of the intermediate substrate 10 to predetermined terminal electrodes of the plurality of touch panel terminal electrodes 22 formed at the edge portion, pad electrodes corresponding to the terminal connections of the touch panel electrodes 21 formed on the inner surface of the film substrate 12, and lead wires which connect the pad electrodes to the remaining predetermined terminal electrodes of the plurality of touch panel terminal electrodes 22.

The touch panel 2 is constituted by jointing the intermediate substrate 10 and the touch panel film substrate 12 with a second frame-shaped sealing member 23 inserted therebetween and electrically connecting the terminal connections of the touch panel electrodes 21 formed on the inner surface of the touch panel substrate 12 to the pad electrodes on the front surface of the intermediate substrate 10 through conductive members (not shown) in or near the substrate joint region by the frame-shaped sealing member 23.

This stacked display device is a TN (Twisted Nematic) type liquid crystal display device, for which the initial aligned state of the liquid crystal molecules in the liquid crystal layer 19 of the liquid crystal display panel 1 is twisted alignment with a predetermined twist angle (e.g., almost 90°), and polarizing plates 24 and 25 are arranged on the rear surface of the liquid crystal display panel 1 (outer surface of the display panel substrate 11) and the front surface of the touch panel 2 (outer surface of the touch panel film substrate 12) while extending their transmission axes in predetermined directions.

The stacked display device shown in FIG. 1 has a composite combination with the touch panel 2 stacked on the front surface of the liquid crystal display panel 1. However, some stacked display devices have two display panels stacked on the front and rear sides. For example, in a two-stacked display device having two liquid crystal display panels stacked, conventionally, the touch panel 2 of the stacked display device shown in FIG. 1 is replaced with a second liquid crystal display panel.

However, as shown in FIG. 1, the conventional stacked display device has the intermediate substrate 10 shared as substrates on the adjacent sides of the first panel (liquid crystal display panel in FIG. 1) 1 and second panel (touch panel in FIG. 1) 2, the first panel substrate 11 opposing the rear surface of the intermediate substrate 10, and the second panel substrate 12 opposing the front surface of the intermediate substrate 10, in which the first panel electrodes 13 and 14 are formed on one surface of the intermediate substrate 10 and the inner surface of the first panel substrate 11, and the second panel electrodes 20 and 21 are formed on the other surface of the intermediate substrate 10 and the inner surface of the second panel substrate 12. For this reason, three substrates, i.e., the intermediate substrate 10, first panel substrate 11, and second panel substrate 12 must be manufactured. This results in an increase in the number of manufacturing processes and an increase in manufacturing cost.

Additionally, in the conventional stacked display device, since the terminal electrodes 17 of the first panel 1 are formed at the edge portion of one of the intermediate substrate 10 and first panel substrate 11 (first panel substrate 11 in FIG. 1), and the terminal electrodes 22 of the second panel 2 are formed at the edge portion of one of the intermediate substrate 10 and second panel substrate 12 (intermediate substrate 10 in FIG. 1), the driving circuit for the first panel, which is connected to the terminal electrodes 17 of the first panel 1, and that for the second panel, which is connected to the terminal electrodes 22 of the second panel 2, must be connected in separate processes. Hence, the electrical connection operation in mounting this stacked display device in an electronic device is cumbersome, resulting in an increase in mounting labor.

BRIEF SUMMARY OF THE INVENTION

It is an object of the present invention to provide a stacked display device which decreases the number of substrates to be used, can easily be manufactured at low cost by a small number of manufacturing processes, and is convenient for wiring connection to an external circuit.

In order to achieve the above object, according to the present invention, there is provided a stacked display device comprising:

one first substrate having electrodes formed on both of a front surface and a rear surface;

one second substrate having a one-end-side portion opposing the front surface of the first substrate and the other-end-side portion opposing the rear surface of the first substrate, the second substrate having a first panel electrode assembly opposing the electrodes formed on the front surface of the first substrate, a second panel electrode assembly opposing the electrodes formed on the rear surface of the first substrate, and a plurality of terminal electrodes electrically connected to the first panel electrode assembly and/or the second panel electrode assembly;

a first connecting member which connects the first substrate and the one-end-side portion of the second substrate to construct a first panel;

a second connecting member which connects the first substrate and the other-end-side portion of the second substrate to construct a second panel; and an electrooptic substance layer having an electrooptic effect and formed between the first substrate and the second substrate at least in one of the first panel and second panel.

According to this stacked display device, since one substrate is formed into a substantially U-shape, and another substrate is disposed in the opposite portions of the substrate to form a stacked display device having two panels stacked, the number of substrates can be two, i.e., smaller than three for the prior-art device. In addition, electrodes for the two panels can be formed together on the substrate having the U shape. Hence, the number of processes and labor in manufacturing the stacked display device largely decrease to considerably reduce the manufacturing cost.

Furthermore, since the first panel electrode assembly and second panel electrode assembly are formed together on one substrate, terminal electrodes to be connected to these electrode assemblies can be arranged together at one portion, and wiring connection to an external circuit in mounting the device in an electronic device is very easy.

In the above stacked display device, the second substrate preferably comprises a flexible film substrate that can be bent at a predetermined portion to sandwich the first substrate while causing both side portions to oppose the two surfaces of the first substrate. When the edge portion on one side of the second substrate projects from the first substrate, and the terminal electrodes connected to the first panel electrode assembly and those connected to the second panel electrode assembly are arranged together at the projecting edge portion, wiring connection to an external circuit such as a driving circuit is facilitated.

In the above stacked display device, the first panel electrode assembly comprises first panel electrodes opposing the electrodes formed on the front surface of the first substrate, and wiring members for connecting the first panel electrodes to corresponding electrodes of the terminal electrodes. In this case, preferably, the front surface of the first substrate has a plurality of terminal connections connected to the electrodes on the front surface, and the first panel electrode assembly comprises a plurality of pad electrodes correspondingly connected to the plurality of terminal connections on the first substrate, respectively, and wiring members for connecting the pad electrodes to corresponding electrodes of the terminal electrodes. Thus, the terminal electrodes corresponding to the electrodes opposing the first panel electrodes, which are formed on the first substrate, can also be arranged together at the predetermined edge portion of the second substrate, and connection to an external circuit in mounting is further facilitated.

In the above stacked display device, the second panel electrode assembly comprises second panel electrodes opposing the electrodes formed on the rear surface of the first substrate, and wiring members for connecting the second panel electrodes to corresponding electrodes of the terminal electrodes. In this case, the rear surface of the first substrate has a plurality of terminal connections connected to the electrodes on the rear surface, and the second panel electrode assembly comprises a plurality of pad electrodes correspondingly connected to the plurality of terminal connections formed on the first substrate, respectively, and wiring members for connecting the pad electrodes to corresponding electrodes of the terminal electrodes. Thus, the terminal electrodes corresponding to the electrodes on the first substrate, which oppose the second panel electrodes, can also be arranged together at the predetermined edge portion of the second substrate, and connection to an external circuit in mounting is further facilitated.

In the above stacked display device, preferably, one of the first and second panels comprises a display panel having the electrooptic substance layer formed between the first and second substrates, and the other panel comprises a touch input panel. A liquid crystal is preferable for the electrooptic substance layer in that case.

In the above stacked display device, both of the first and second panels may comprise display panels each having the electrooptic substance layer formed between the first and second substrates. A liquid crystal is preferable as the electrooptic substance layer in that case as well.

The above-described object of the present invention can also be achieved by a stacked display device comprising:

one intermediate substrate having electrodes formed on both of a front surface and a rear surface;

one flexible substrate bent at a predetermined portion and sandwiching the intermediate substrate with a one-end-side portion from the bent portion opposing the front surface of the intermediate substrate and the other-end-side portion from the bent portion opposing the rear surface of the intermediate substrate, one of the side portions having an edge portion projecting from the intermediate substrate, the flexible substrate having a first panel electrode assembly opposing the electrodes formed on the front surface of the intermediate substrate, a second panel electrode assembly opposing the electrodes formed on the rear surface of the intermediate substrate, and a plurality of terminal electrodes formed at the projecting edge portion and electrically connected to the first panel electrode assembly and/or the second panel electrode assembly;

a first connecting member which connects the intermediate substrate and the one-end-side portion of the film substrate to construct a first panel;

a second connecting member which connects the intermediate substrate and the other-end-side portion of the film substrate to construct a second panel; and an electrooptic substance layer having an electrooptic effect and formed between the intermediate substrate and the film substrate at least in one of the first and second panels.

According to this stacked display device, one flexible substrate is bent to two side portions, and another substrate is disposed between the side portions to form a stacked display device having two panels stacked. For this reason, the number of substrates can be as small as two, and the stacked display device can easily be manufactured only by bending one flexible substrate. In addition, electrodes of the two panels can be formed together on one flexible substrate. Hence, the number of processes and labor in manufacturing the stacked display device decrease to greatly reduce the manufacturing cost.

In the above stacked display device, the first panel electrode assembly preferably comprises a plurality of first panel electrodes opposing the electrodes formed on the front surface of the intermediate substrate, and a plurality of wiring members for connecting the first panel electrodes to corresponding electrodes of the terminal electrodes. In this case, preferably, the front surface of the intermediate substrate has a plurality of terminal connections connected to the electrodes on the front surface, and the first panel electrode assembly formed on the flexible substrate comprises a plurality of pad electrodes correspondingly connected to the plurality of terminal connections, respectively, and wiring members for connecting the pad electrodes to corresponding electrodes of the terminal electrodes.

In the above stacked display device, the second panel electrode assembly preferably comprises a plurality of second panel electrodes opposing the electrodes formed on the rear surface of the intermediate substrate, and a plurality of wiring members for connecting the second panel electrodes to corresponding terminal electrodes. In this case, preferably, the rear surface of the intermediate substrate has a plurality of terminal connections connected to the electrodes on the rear surface, and the second panel electrode assembly formed on the flexible substrate comprises a plurality of pad electrodes correspondingly connected to the plurality of terminal connections formed on the intermediate substrate, respectively, and wiring members for connecting the pad electrodes to corresponding electrodes of the terminal electrodes.

In the above stacked display device, preferably, one of the first and second panels comprises a display panel having the electrooptic substance layer formed between the intermediate substrate and the flexible substrate, and the other panel comprises a touch input panel.

In the above stacked display device, both of the first and second panels may comprise display panels each having the electrooptic substance layer formed between the intermediate substrate and the flexible substrate.

The above object of the present invention can also be achieved by a stacked display device constructed by stacking a first panel and a second panel, comprising one intermediate substrate, one outer substrate having a one-end-side portion opposing front surface of the intermediate substrate and the other-end-side portion opposing the rear surface of the intermediate substrate, a plurality of terminal electrodes formed at an edge portion on one side of the outer substrate, a first panel electrode assembly formed on the front surface of the intermediate substrate and on an inner surface of the one-end-side portion of the outer substrate while making at least some parts oppose each other and connected to predetermined terminal electrodes of the plurality of terminal electrodes, a second panel electrode assembly formed on the rear surface of the intermediate substrate and on an inner surface of the other-end-side portion of the outer substrate while making at least some parts oppose each other and connected to the remaining terminal electrodes of the plurality of terminal electrodes, a first joint member which joints the intermediate substrate and the one-end-side portion of the outer substrate to construct the first panel, a second joint member which joints the intermediate substrate and the other-end-side portion of the outer substrate to construct the second panel, and an electrooptic substance layer having an electrooptic effect and formed between the intermediate substrate and the outer substrate at least in one of the first and second panels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described below with reference to the accompanying drawings.

Figure 1:
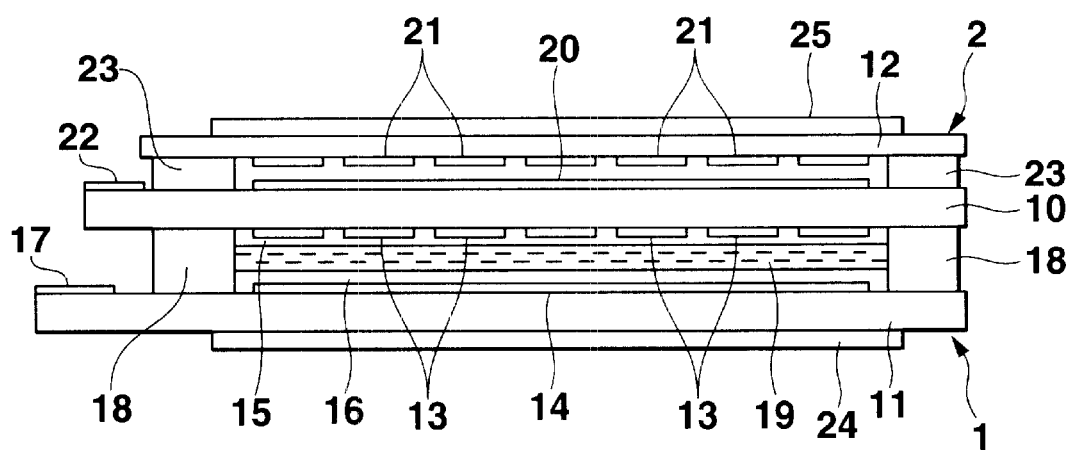
FIG. 1 is a sectional view showing a conventional stacked display device while omitting the hatching.
Figure 2A:
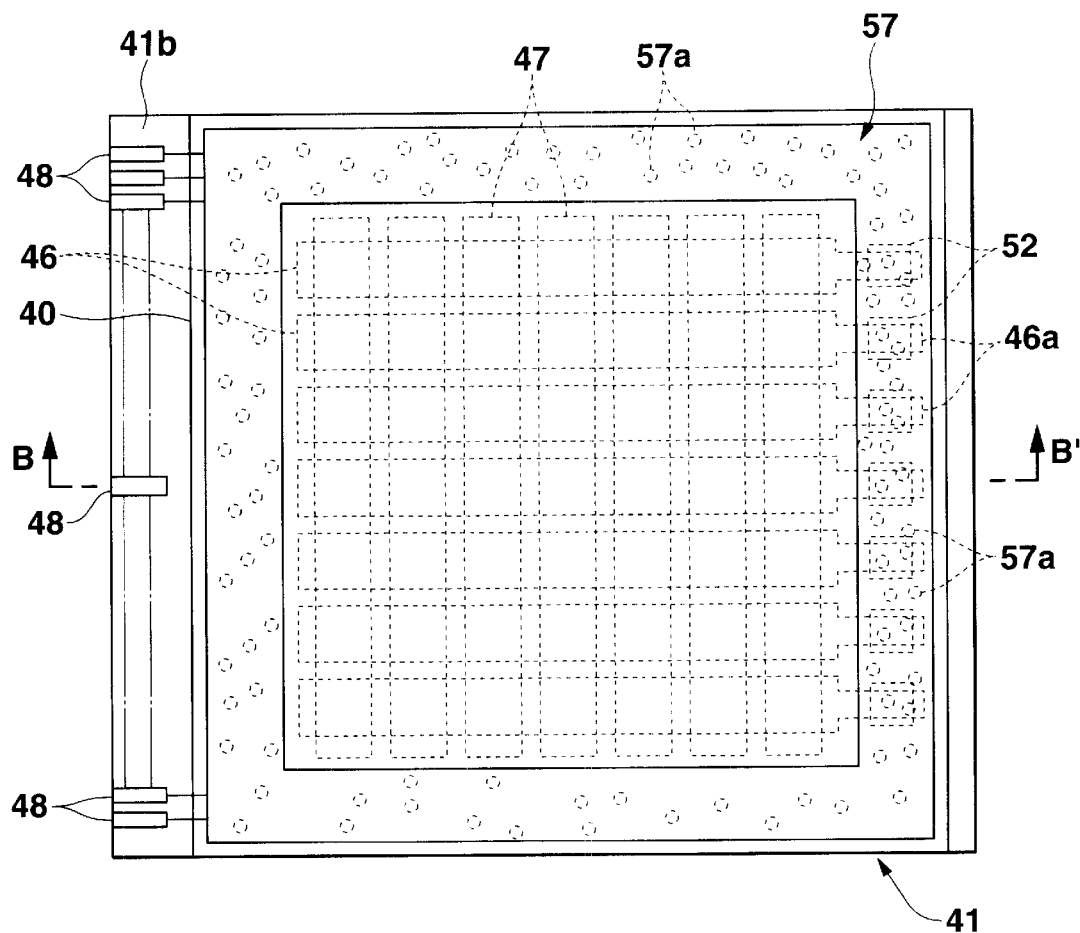
FIGS. 2A and 2B are a plan view showing a stacked display device according to the first embodiment of the present invention and a sectional view taken along a line B–B' while omitting the hatching, respectively.
Figure 2B:
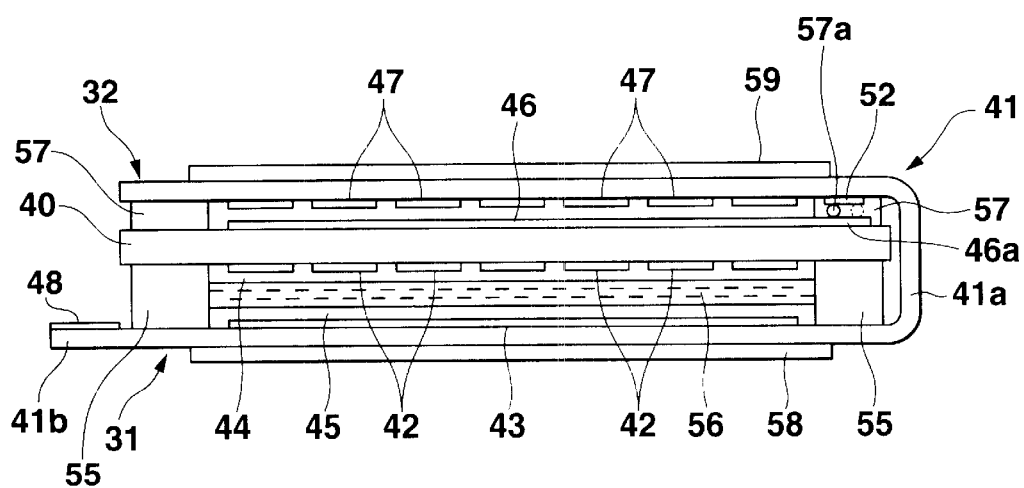
Figure 3A:
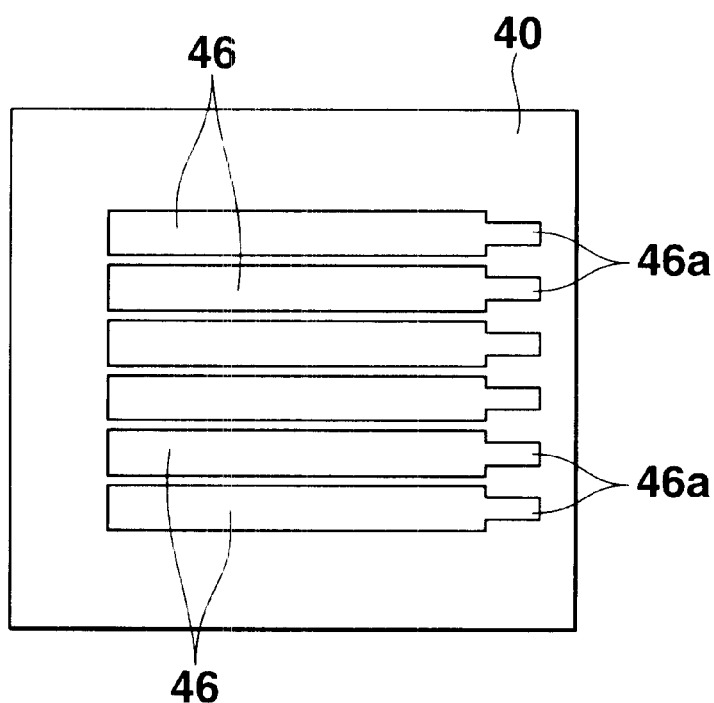
FIGS. 3A and 3B are plan views showing an intermediate substrate used in the stacked display device of the first embodiment from the front surface side and from the rear surface side, respectively.
Figure 3B:
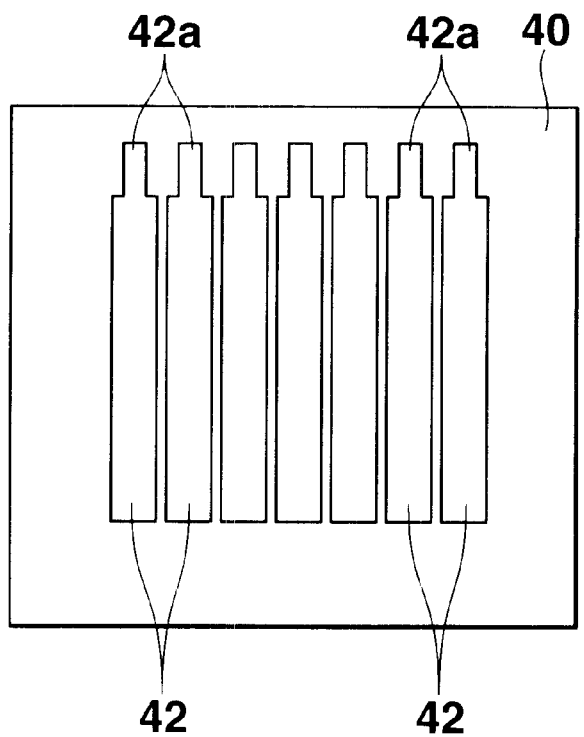
Figure 4:
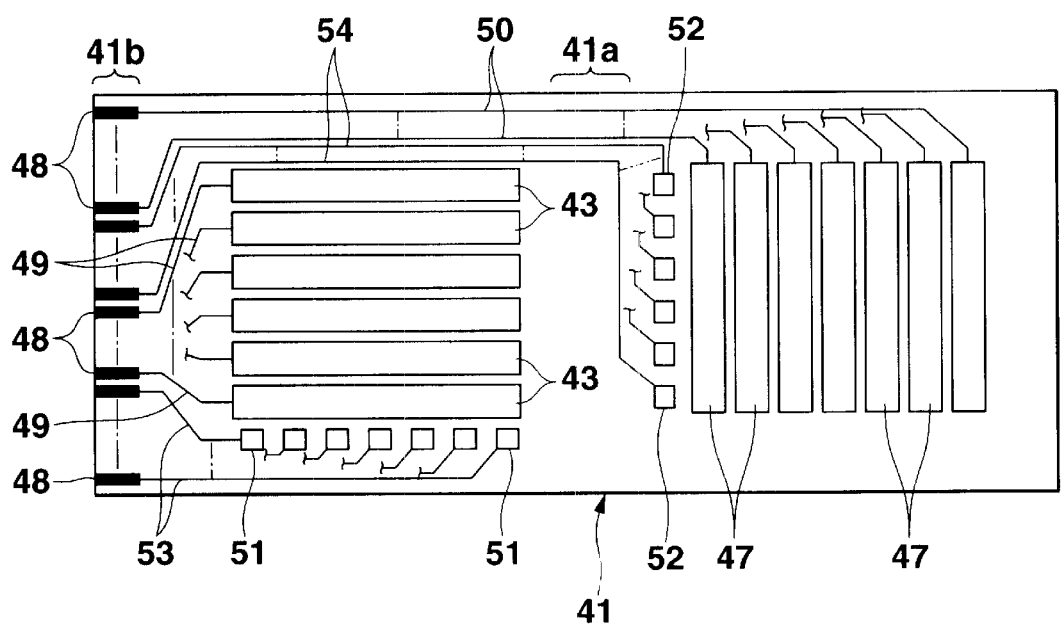
FIG. 4 is an exploded plan view showing a film substrate used in the stacked display device of the first embodiment.

FIGS. 2A to 4 show the first embodiment of the present invention. FIGS. 2A and 2B are a plan view showing a stacked display device according to the first embodiment and a sectional view taken along a line B–B', respectively. For the descriptive convenience, the front-side polarizing plate is omitted in the plan view of FIG. 2A, and the hatching is omitted in the sectional view of FIG. 2B. FIGS. 3A and 3B are plan views showing an intermediate substrate used in the stacked display device from the front surface side and from the rear surface side, respectively. FIG. 4 is an exploded plan view showing a film substrate used in the stacked display device.

For the stacked display device of this embodiment, observation is done from the upper side as shown in FIG. 2B, and a touch input panel (to be referred to as a touch panel hereinafter) 32 for inputting coordinates is stacked on the front surface as the display observation side of a liquid crystal display panel 31.

As shown in FIG. 2B, this stacked display device has a transparent intermediate substrate (first substrate) 40 formed from glass, and a film substrate or outer substrate (second substrate) 41 formed from a transparent resin film having flexibility.

As shown in FIG. 4, the film substrate 41 has a rectangular shape long in the horizontal direction, almost the same width as that of the intermediate substrate 40, and a length larger than twice the length of the intermediate substrate 40. This film substrate is bent to two parts or side portions at a bent portion 41a almost at the intermediate portion of the length, thereby integrally forming the liquid crystal display panel 31 and touch panel 32 extending parallel to each other and opposing each other at a predetermined interval. The bent portion 41a has a length almost equal to the sum of the gap between the liquid crystal display panel 31 and the touch panel 32 and the thickness of the intermediate substrate 40.

In the bent film substrate 41, the intermediate substrate 40 is parallelly arranged while keeping a predetermined interval. Thus, a one-end-side portion (substrate section of the liquid crystal display panel 31) from the bent portion of the film substrate 41 opposes the rear surface of the intermediate substrate 40, while the other-end-side portion (substrate section of the touch panel 32) from the bent portion opposes the front surface of the intermediate substrate 40. One of the end side portions of the film substrate 41, for example, the one-end-side portion opposing the rear surface of the intermediate substrate 40 as its edge portion 41b projects from the intermediate substrate 40 in the horizontal direction.

A plurality of transparent display panel electrodes 42 and 43 are formed on the rear surface of the intermediate substrate 40 and on the inner surface of the one-end-side portion of the film substrate 41 opposing the rear surface of the intermediate substrate 40, respectively. Alignment films 44 and 45 cover the display panel electrodes 42 and 43, respectively.

The liquid crystal display panel 31 of this example is of, e.g., simple matrix type. Hence, as shown in FIGS. 3B and 4, of the display panel electrodes 42 and 43, for example, the display panel electrodes 43 formed on the inner surface of the one-end-side portion of the film substrate 41 serve as a plurality of scanning electrodes formed parallel to each other along the row direction (horizontal direction of the screen), and the display panel electrodes 42 formed on the rear surface of the intermediate substrate 40 as the counter electrodes serve as a plurality of strip-shaped signal electrodes formed parallel to each other along the column direction (vertical direction of the screen). A terminal connection 42a is formed at one end of each of the display panel electrodes 42 formed on the rear surface of the intermediate substrate 40 so as to extend in or near the substrate joint region by a first frame-shaped sealing member 55 (to be described later).

On the other hand, a plurality of transparent touch panel electrodes 46 and 47 are formed on the front surface of the intermediate substrate 40 and on the inner surface of the other-end-side portion of the film substrate 41 opposing the front surface of the intermediate substrate 40, respectively.

The touch panel 32 is a contact type touch panel: when the other-end-side portion of the film substrate 41 as the substrate on the front surface side, i.e., the coordinate input side is pressed, it partially deflects and deforms inward so that the touch panel electrode 47 on the inner surface of the film substrate 41 at that portion comes into contact with the touch panel electrode 46 on the front surface of the intermediate substrate 40. AS shown in FIGS. 3A and 4, of the touch panel electrodes 46 and 47, for example, the touch panel electrodes 46 formed on the front surface of the intermediate substrate 40 serve as a plurality of strip-shaped x-coordinate electrodes formed parallel to each other along the row direction, and the touch panel electrodes 47 formed on the inner surface of the other-end-side portion of the film substrate 41 as the counter electrode serve as a plurality of strip-shaped y-coordinate electrodes formed parallel to each other along the column direction. A terminal connection 46a is formed at one end of each of the touch panel electrodes 46 formed on the front surface of the intermediate substrate 40 so as to extend in or near the substrate joint region by a second frame-shaped sealing member 57 (to be described later).

A plurality of terminal electrodes 48 corresponding to the display panel electrodes 42 and 43 and touch panel electrodes 46 and 47 and electrically connected to these electrodes, respectively, are formed on the inner surface of the edge portion 41b of the film substrate 41, which projects from the intermediate substrate 40. That is, in the stacked display device of this embodiment, the connection terminals of all electrodes are concentrated to one position convenient for connection to an external circuit.

As shown in FIG. 4, a plurality of lead wires 49 and 50 are formed on the inner surface of the film substrate 41 to connect the display panel electrodes 43 and touch panel electrodes 47 formed on the inner surface of the film substrate to predetermined terminal electrodes of the plurality of terminal electrodes 48 formed at the edge portion 41b. In addition, a plurality of pad electrodes 51 and 52 corresponding to the terminal connections 42a and 46a of the display panel electrodes 42 and touch panel electrodes 46 formed on the rear and front surfaces of the intermediate substrate, respectively, and a plurality of lead wires 53 and 54 for connecting the pad electrodes 51 and 52 to the remaining predetermined terminal electrodes of the plurality of terminal electrodes 48 are formed on the inner surface of the substrate 41.

The intermediate substrate 40 and the one-end-side portion of the film substrate 41 opposing the rear surface of the intermediate substrate 40 are jointed by a first frame-shaped sealing member 55, as shown in FIG. 2B. The terminal connections 42a of the display panel electrodes 42 formed on the rear surface of the intermediate substrate 40 and the pad electrodes 51 on the inner surface of the film substrate 41 are electrically connected through conductive members (not shown) in or near the substrate joint region by the sealing member 55. A liquid crystal is encapsulated in the region surrounded by the sealing member 55 between the rear surface of the intermediate substrate 40 and the one-end-side portion of the film substrate 41 to form a liquid crystal layer 56. The liquid crystal display panel 31 has the above-described structure.

The touch panel 32 has the following structure. The intermediate substrate 40 and the other-end-side portion of the film substrate 41 opposing the front surface of the intermediate substrate 40 are jointed at a predetermined interval by a second frame-shaped sealing member 57, as shown in FIG. 2B. The terminal connections 46a of the touch panel electrodes 46 formed on the front surface of the intermediate substrate 40 and the pad electrodes 52 on the inner surface of the film substrate 41 are electrically connected through conductive members 57a in or near the substrate joint region by the sealing member 57. In this case, the conductive members 57a are formed from conductive particles uniformly dispersed and mixed in the frame-shaped sealing member 57. Hence, the terminal connections 46a and pad electrodes 52 are electrically connected in the substrate joint region by the sealing member 57. The conductive particles are uniformly mixed in the frame-shaped sealing member 57 at such a distribution concentration that proper conduction can always be obtained in the region where the pad electrodes 52 and terminal connections 46a oppose each other. The sealing member constructing the touch panel 32 need not always have the frame shape to seal the interior. For example, the divided sealing members may be divisionally provided at a plurality of necessary portions such as corners, and any other shape can be employed as long as the intermediate substrate 40 and the other end side of the film substrate 41 opposing the front surface of the intermediate substrate 40, which require a sealing member, can be reliably jointed.

The liquid crystal display panel 31 of this embodiment is a TN (Twisted Nematic) type liquid crystal panel, for which the initial aligned state of the liquid crystal molecules in the liquid crystal layer 56, i.e., the aligned state in the absence of field with no drive voltage being applied between the display panel electrodes 42 and 43 is twisted alignment with a predetermined twist angle (e.g., almost 90°). Hence, as shown in FIG. 2B, polarizing plates 58 and 59 are arranged on the rear surface of the liquid crystal display panel 31 (outer surface of the one-end-side portion of the film substrate 41 opposing the rear surface of the intermediate substrate 40) and the front surface of the touch panel 32 (outer surface of the other-end-side portion of the film substrate 41 opposing the front surface of the intermediate substrate 40) while extending their transmission axes in predetermined directions.

As described above, the stacked display device in which the liquid crystal display panel 31 and touch panel 32, i.e., the first and the second panels, are stacked can be constituted by bending one flexible film substrate (second substrate) to have two side portions and inserting one intermediate substrate (first substrate) therebetween. That is, the stacked display device can be constructed using substrates in number as small as only two. In addition, the electrode assembly on one side of each of the liquid crystal display panel 31 and touch panel 32, including the electrodes, terminal electrodes, and lead wires, can easily be formed together on the film substrate 41 when it is flat before bending, as shown in FIG. 4. Hence, the number of processes and labor in manufacturing the stacked display device largely decrease to considerably reduce the manufacturing cost.

Additionally, in the stacked display device of this embodiment, the display panel electrodes 43 on one side of the liquid crystal display panel 31 and the touch panel electrodes 47 on one side of the touch panel 32 are formed on the inner surface of one film substrate 41. Thus, the plurality of terminal electrodes 48 corresponding to the display panel electrodes 42 and 43 and touch panel electrodes 46 and 47 can be formed together at one position of the edge portion 41b of the film substrate 41. Hence, in mounting this stacked display device in an electronic device, the driving circuit for the liquid crystal display panel 31 and that for the touch panel 32 can easily be connected together. As a result, the operation efficiency in mounting this stacked display device in an electronic device greatly improves.

In the stacked display device of the above embodiment, the respective electrodes on the intermediate substrate side are connected to the lead wires on the film substrate side through conductive members. However, the present invention is not limited to this. The back-side end face of the intermediate substrate may be abutted against the inner surface of the film substrate, and the respective electrodes on the intermediate substrate side may be directly electrically connected to the lead wires on the film substrate side.

In the stacked display device of the above embodiment, the liquid crystal display panel 31 is of simple matrix type. However, the liquid crystal display panel 31 need not only be simple matrix type but also be active matrix type or segment type.

The stacked display device of the above embodiment is a TN-type liquid crystal display device. However, the present invention can also be applied to an STN (Super Twisted Nematic) type stacked display device for which liquid crystal molecules are twisted at an angle of 180° to 270° (normally, 230° to 250°), or a layered liquid crystal display device using a ferroelectric or anti-ferroelectric liquid crystal or a polymer-dispersed liquid crystal.

In the stacked display device of the above embodiment, the touch panel 32 is a contact-type touch panel. However, the touch panel 32 may be a capacitance-type touch panel whose capacitance changes upon contact of a conductive object such as a fingertip.

In the stacked display device of the above embodiment, of the first and second panels, the rear-side panel 31 is formed from a liquid crystal display panel, and the front-side panel 32 is formed from a touch panel. However, the present invention can also be applied to a stacked display device having a two-layered structure in which both of the first and second panels are formed from display panels such as liquid crystal panels.

Figure 5:
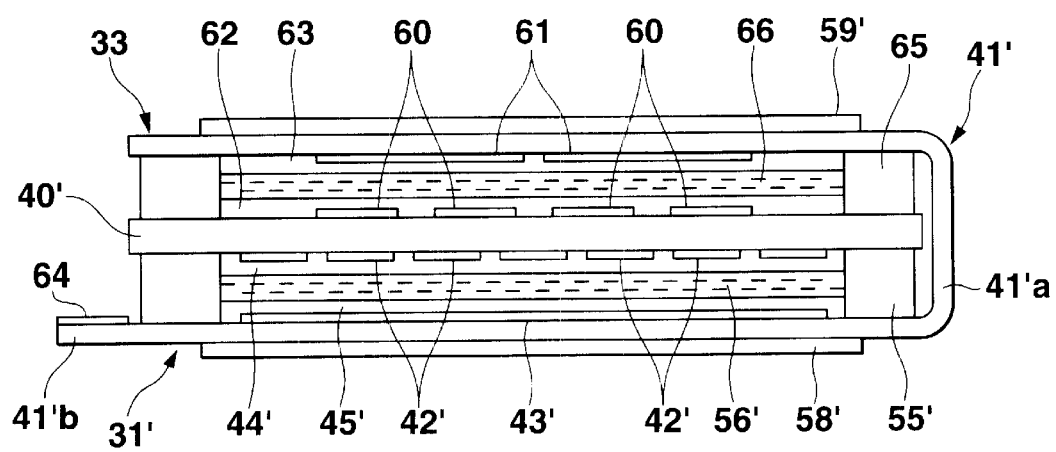
FIG. 5 is a sectional view showing a stacked display device according to the second embodiment of the present invention while omitting the hatching.

FIG. 5 is a sectional view showing a stacked display device according to the second embodiment of the present invention while omitting the hatching. In this embodiment, both a first panel 31' and second panel 33 are formed from liquid crystal panels.

The stacked display device of this embodiment comprises one intermediate substrate 40', and a film substrate 41' which is bent at a predetermined portion, causes a one-end-side portion from a bent portion 41'a to oppose the rear surface of the intermediate substrate 40', causes the other-end-side portion from the bent portion 41'a to oppose the front surface of the intermediate substrate 40', and causes the edge portion on an arbitrary side, e.g., an edge portion 41'b of the one-end-side portion opposing the rear surface of the intermediate substrate 40' to project from the intermediate substrate 40'.

In this embodiment, first display panel electrodes 42' and 43' partially opposing each other and alignment films 44' and 45' covering these electrodes 42' and 43', respectively, are formed on the rear surface of the intermediate substrate 40' and on the inner surface of the one-end-side portion of the film substrate 41' opposing the rear surface of the intermediate substrate 40', respectively. Second display panel electrodes 60 and 61 partially opposing each other and alignment films 62 and 63 covering these electrodes 60 and 61, respectively, are formed on the front surface of the intermediate substrate 40' and on the inner surface of the other-end-side portion of the film substrate 41' opposing the front surface of the intermediate substrate 40', respectively. A plurality of terminal electrodes 64 corresponding to the first display panel electrodes 42' and 43' and second display panel electrodes 60 and 61, respectively, are formed together at the edge portion 41'b of the film substrate 41' projecting from the intermediate substrate 40'.

In this embodiment, the first liquid crystal display panel 30' is constituted by jointing the intermediate substrate 40' and the one-end-side portion of the film substrate 41' by a first frame-shaped sealing member 55' and forming a liquid crystal layer 56' between the intermediate substrate 40' and the one-end-side portion of the film substrate 41'. In addition, the second liquid crystal display panel 33 is constituted by jointing the intermediate substrate 40' and the other-end-side portion of the film substrate 41' by a second frame-shaped sealing member 65 and forming a liquid crystal layer 66 between the intermediate substrate 40' and the other-end-side portion of the film substrate 41'.

In this embodiment, the first liquid crystal display panel 30' is formed from a simple-matrix-type liquid crystal display panel like the liquid crystal display panel 31 of the first embodiment, and the second liquid crystal display panel 33 is formed from a segment-type panel which is time-divisionally driven. In the segment-type liquid crystal display panel 33, of the second display panel electrodes 60 and 61 formed on the front surface of the intermediate substrate 40' and on the inner surface of the other-end-side portion of the film substrate 41', for example, the electrodes 60 formed on the front surface of the intermediate substrate 40' serve as a plurality of segment electrodes formed in a shape corresponding to a display pattern, and the electrodes 61 formed on the inner surface of the other-end-side portion of the film substrate 41' serve as common electrodes divided into a plurality of parts.

This stacked display device is a TN-type liquid crystal display device, for which the initial aligned state of the liquid crystal molecules in the liquid crystal layers 56' and 66 of the first and second liquid crystal display panels 30' and 33 is twisted alignment with a predetermined twist angle (e.g., almost 90°), and polarizing plates 58' and 59' are arranged on the rear surface of the first liquid crystal display panel 30' and on the front surface of the second liquid crystal display panel 33 while extending their transmission axes in predetermined directions.

In this embodiment, the stacked display device in which two panels, i.e., the first liquid crystal display panel 30' and second liquid crystal display panel 33 are stacked using one intermediate substrate (first substrate) 40' and one film substrate (second substrate) 41' bent at a predetermined portion and sandwiching the intermediate substrate 40' is constructed, as in the first embodiment. In addition, the plurality of terminal electrodes 64 corresponding to the first and second display panel electrodes 42', 43', 60, and 61, respectively, are formed together at the edge portion 41'b on one side of the film substrate 41'.

Hence, the number of substrates in use is as small as two, i.e., the film substrate 41' and intermediate substrate 40'. In addition, since the electrode assembly on one side of each of the first and second liquid crystal display panels, including the electrodes and lead wires, can easily be formed together on one film substrate 41', the number of processes and labor in manufacturing largely decrease. In addition, in mounting this device in an electronic device, since the driving circuit for the first panel and that for the second panel can easily be connected to the terminal electrodes 64 formed at one portion together, the mounting operation efficiency greatly improves.

In this embodiment as well, although not illustrated, preferably, the inner surface of the film substrate 41' has a plurality of lead wires which connect the first and second display panel electrodes 43' and 61 formed on the inner surface of the film substrate 41' to predetermined terminal electrodes of the plurality of terminal electrodes 64 formed at the edge portion of the film substrate 41', a plurality of pad electrodes corresponding to the terminal connections of the first and second display panel electrodes 42' and 60 formed on the rear and front surfaces of the intermediate substrate 40', and a plurality of lead wires which connect the pad electrodes to the remaining predetermined terminal electrodes of the plurality of terminal electrodes. The terminal connections of the first and second display panel electrodes 42' and 60 formed on the rear and front surfaces of the intermediate substrate 40' are preferably electrically connected to the pad electrodes on the inner surface of the film substrate 41' through conductive members, respectively. With this arrangement, the first and second display panel electrodes 42', 43', 60, and 61 can easily be connected to the plurality of terminal electrodes 64 formed together at the edge portion of the film substrate 41'.

In the second embodiment, the first display panel 31' on the rear side is formed from a simple-matrix-type liquid crystal display panel, and the second display panel 33 on the front side is formed from a segment-type liquid crystal display panel. However, the first display panel 31' on the rear side need not always be of simple matrix type and may be of active matrix type or segment type. The second display panel 33 on the front side also need not always be of segment type and may be of simple matrix type or active matrix type. The second display panel 33 on the front side may be a display panel having a touch input function.

In the first embodiment, the display panel 31 as the first panel on the rear side is formed from a liquid crystal display panel, and in the second embodiment, both of the first and second display panels 31' and 33 are formed from liquid crystal display panels. However, the display panel 31, 31', or 33 may be a display panel having a layer of an electrooptic substance other than a liquid crystal, for example, an electrochromic or electrophoretic substance inserted between the intermediate substrate 40 or 40' and the film substrate 41 or 41'.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stacked display device comprising:
    one first substrate having electrodes formed on both of a front surface and a rear surface;
    one second substrate having a one-end-side portion opposing the front surface of said first substrate and the other-end-side portion opposing the rear surface of said first substrate, said second substrate having a first panel electrode assembly opposing the electrodes formed on the front surface of said first substrate, a second panel electrode assembly opposing the electrodes formed on the rear surface of said first substrate, and a plurality of terminal electrodes electrically connected to the first panel electrode assembly and/or the second panel electrode assembly;
    a first connecting member which connects said first substrate and the one-end-side portion of said second substrate to construct a first panel;
    a second connecting member which connects said first substrate and the other-end-side portion of said second substrate to construct a second panel; and
    an electrooptic substance layer having an electrooptic effect and formed between said first substrate and said second substrate at least in one of the first and second panels.

2. A device according to claim 1, wherein said second substrate comprises a flexible film substrate bent at a predetermined portion and sandwiching said first substrate to cause the one-end-side portion and the other-end-side portion to oppose said first substrate.

3. A device according to claim 1, wherein said second substrate has an edge portion projecting from said first substrate on one of the one-end-side portion and the other-end-side portion.

4. A device according to claim 3, wherein the edge portion has the plurality of terminal electrodes.

5. A device according to claim 1, wherein the first panel electrode assembly comprises first panel electrodes opposing the electrodes formed on the front surface of said first substrate, and wiring members for connecting the first panel electrodes to corresponding electrodes of the terminal electrodes.

6. A device according to claim 5, wherein
    the front surface of said first substrate has a plurality of terminal connections connected to the electrodes on the front surface, and
    the first panel electrode assembly on said second substrate comprises a plurality of pad electrodes correspondingly connected to the plurality of terminal connections formed on the front surface of said first substrate, respectively, and wiring members for connecting the pad electrodes to corresponding electrodes of the terminal electrodes.

7. A device according to claim 1, wherein the second panel electrode assembly comprises second panel electrodes opposing the electrodes formed on the rear surface of said first substrate, and wiring members for connecting the second panel electrodes to corresponding electrodes of the terminal electrodes.

8. A device according to claim 7, wherein
    the rear surface of said first substrate has a plurality of terminal connections connected to the electrodes formed on the rear surface, and
    the second panel electrode assembly on said second substrate comprises a plurality of pad electrodes correspondingly connected to the plurality of terminal connections formed on the rear surface of said first substrate, respectively, and wiring members for connecting the pad electrodes to corresponding electrodes of the terminal electrodes.

9. A device according to claim 1, wherein one of the first and second panels comprises a display panel having said electrooptic substance layer formed between said first and second substrates, and the other panel comprises a touch input panel.

10. A device according to claim 9, wherein said electrooptic substance layer comprises a liquid crystal layer.

11. A device according to claim 1, wherein both of the first and second panels comprise display panels each having said electrooptic substance layer formed between said first and second substrates.

12. A device according to claim 11, wherein said electrooptic substance layer comprises a liquid crystal layer.

13. A stacked display device comprising:
    one intermediate substrate having electrodes formed on both of a front surface and a rear surface;
    one flexible substrate bent at a predetermined portion and sandwiching said intermediate substrate with a one-end-side portion from the bent portion opposing the front surface of said intermediate substrate and the other-end-side portion from the bent portion opposing the rear surface of said intermediate substrate, one of the side portions having an edge portion projecting from said intermediate substrate, said flexible substrate having a first panel electrode assembly opposing the electrodes formed on the front surface of said intermediate substrate, a second panel electrode assembly opposing the electrodes formed on the rear surface of said intermediate substrate, and a plurality of terminal electrodes formed at the projecting edge portion and electrically connected to the first panel electrode assembly and/or the second panel electrode assembly;
    a first connecting member which connects said intermediate substrate and the one-end-side portion of said flexible substrate to construct a first panel;
    a second connecting member which connects said intermediate substrate and the other-end-side portion of said flexible substrate to construct a second panel; and
    an electrooptic substance layer having an electrooptic effect and formed between said intermediate substrate and said flexible substrate at least in one of the first panel and second panel.

14. A device according to claim 13, wherein the first panel electrode assembly comprises first panel electrodes opposing the electrodes formed on the front surface of said intermediate substrate, and wiring members for connecting the first panel electrodes to corresponding electrodes of the terminal electrodes.

15. A device according to claim 14, wherein
the front surface of said intermediate substrate has a plurality of terminal connections connected to the electrodes on the front surface, and the first panel electrode assembly formed on said flexible substrate comprises a plurality of pad electrodes correspondingly connected to the plurality of terminal connections formed on the front surface of said intermediate substrate, respectively, and wiring members for connecting the pad electrodes to corresponding electrodes of the terminal electrodes.

16. A device according to claim 13, wherein the second panel electrode assembly formed on said flexible substrate comprises second panel electrodes opposing the electrodes formed on the rear surface of said intermediate substrate, and wiring members for connecting the second panel electrodes to corresponding electrodes of the terminal electrodes.

17. A device according to claim 16, wherein
the rear surface of said intermediate substrate has a plurality of terminal connections connected to the electrodes on the rear surface, and the second panel electrode assembly formed on said flexible substrate comprises a plurality of pad electrodes correspondingly connected to the plurality of terminal connections formed on the rear surface of said intermediate substrate, respectively, and wiring members for connecting the pad electrodes to corresponding electrodes of the terminal electrodes.

18. A device according to claim 13, wherein one of the first and second panels comprises a display panel having said electrooptic substance layer formed between said intermediate substrate and said flexible substrate, and the other panel comprises a touch input panel.

19. A device according to claim 13, wherein both of the first and second panels comprise display panels each having said electrooptic substance layer formed between said intermediate substrate and said flexible substrate.

20. A stacked display device constructed by stacking a first panel and a second panel, comprising:

one intermediate substrate;

one outer substrate having a one-end-side portion opposing front surface of said intermediate substrate and the other-end-side portion opposing the rear surface of said intermediate substrate;

a plurality of terminal electrodes formed at an edge portion on one side of said outer substrate;

a first panel electrode assembly formed on the front surface of said intermediate substrate and on an inner surface of the one-end-side portion of said outer substrate while making at least some parts oppose each other and connected to predetermined terminal electrodes of said plurality of terminal electrodes;

a second panel electrode assembly formed on the rear surface of said intermediate substrate and on an inner surface of the other-end-side portion of said outer substrate while making at least some parts oppose each other and connected to the remaining terminal electrodes of said plurality of terminal electrodes;

a first joint member which joints said intermediate substrate and the one-end-side portion of said outer substrate to construct the first panel;

a second joint member which joints said intermediate substrate and the other-end-side portion of said outer substrate to construct the second panel; and an electrooptic substance layer having an electrooptic effect and formed between said intermediate substrate and said outer substrate at least in one of the first panel and second panel.

* * * * *